United States Patent
Stanke

(10) Patent No.: US 10,808,765 B2
(45) Date of Patent: Oct. 20, 2020

(54) PERMANENT MAGNETIC ELECTRICAL MACHINE WITH BEARING RELEASE SYSTEM AND METHOD FOR BEARING REPLACEMENT

(75) Inventor: Norbert Stanke, Meinsdorf (DE)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 2728 days.

(21) Appl. No.: 13/381,875

(22) PCT Filed: Jun. 18, 2010

(86) PCT No.: PCT/DK2010/000096
§ 371 (c)(1),
(2), (4) Date: Apr. 4, 2013

(87) PCT Pub. No.: WO2011/000376
PCT Pub. Date: Jan. 6, 2011

(65) Prior Publication Data
US 2014/0084725 A1    Mar. 27, 2014

Related U.S. Application Data

(60) Provisional application No. 61/222,189, filed on Jul. 1, 2009.

(30) Foreign Application Priority Data

Jun. 30, 2009   (DK) ................................ 2009 70049

(51) Int. Cl.
*H02K 5/00* (2006.01)
*F16C 43/00* (2006.01)
(Continued)

(52) U.S. Cl.
CPC ............ *F16C 43/00* (2013.01); *F16C 35/062* (2013.01); *H02K 7/083* (2013.01);
(Continued)

(58) Field of Classification Search
CPC ........ H02K 5/1732; H02K 7/083; H02K 5/04; H02K 5/15; H02K 5/161; H02K 5/16; H02K 5/1672
(Continued)

(56) References Cited

U.S. PATENT DOCUMENTS 4,626,725 A * 12/1986 Kawada ................... H02K 5/15
                                                      310/89
4,823,032 A *  4/1989 Ward ....................... H02K 5/08
                                                      310/43
(Continued)

FOREIGN PATENT DOCUMENTS

CN       1945930 A     4/2007
DE  102005008794 A1    9/2006
(Continued)

OTHER PUBLICATIONS

International Search Report for Application No. PCT/DK2010/000098 dated Oct. 19, 2010.
(Continued)

*Primary Examiner* — Thanh Lam
(74) *Attorney, Agent, or Firm* — Patterson + Sheridan, LLP

(57) ABSTRACT

A method and apparatus for bearing replacement in an electrical machine is provided. An electrical machine is provided, comprising a stator with at least one stator winding, the stator defining a centre axis, and a rotor comprising magnetic material and having a first end and a second end. The electrical machine further comprises at least one bearing including a first bearing and supporting the rotor in an operational position in relation to the stator allowing the rotor to rotate in relation to the stator about the centre axis, and at least one support element including a first support element and adapted to support the rotor in relation to the stator such that the at least one support element in a support (Continued)

position supports the rotor centred about the centre axis, thereby allowing replacement of the first bearing, the support element in the support position being at least partly positioned between the rotor and the stator in a direction perpendicular to the centre axis.

22 Claims, 9 Drawing Sheets

(51) Int. Cl.
| | | |
|---|---|---|
| *H02K 7/08* | (2006.01) | |
| *H02K 15/00* | (2006.01) | |
| *F16C 35/06* | (2006.01) | |
| *H02K 15/16* | (2006.01) | |
| *H02K 7/18* | (2006.01) | |
| *F16C 19/06* | (2006.01) | |
| *F16C 39/02* | (2006.01) | |

(52) U.S. Cl.
CPC ......... *H02K 15/0006* (2013.01); *H02K 15/16* (2013.01); *F16C 19/06* (2013.01); *F16C 39/02* (2013.01); *F16C 2360/31* (2013.01); *F16C 2380/26* (2013.01); *H02K 7/1838* (2013.01); *Y10T 29/49009* (2015.01); *Y10T 29/49696* (2015.01); *Y10T 29/49698* (2015.01)

(58) Field of Classification Search
USPC ...................... 310/89–91, 401–402, 420–421
See application file for complete search history.

(56) References Cited

U.S. PATENT DOCUMENTS

| | | | | |
|---|---|---|---|---|
| 5,287,030 A | * | 2/1994 | Nutter ...................... | H02K 5/00 310/89 |
| 5,610,461 A | * | 3/1997 | Dohogne ................. | H02K 5/15 310/89 |
| 6,211,587 B1 | * | 4/2001 | Enomoto ............... | H02K 1/185 310/216.057 |
| 7,355,316 B2 | | 4/2008 | Yokota et al. | |
| 7,942,651 B2 | * | 5/2011 | Bin-Nun .................. | F25B 1/02 310/153 |

FOREIGN PATENT DOCUMENTS

| | | |
|---|---|---|
| EP | 2063117 A1 | 5/2009 |
| GB | 1572619 A | 7/1980 |
| WO | 2007131889 A1 | 11/2007 |

OTHER PUBLICATIONS

Australian Government Patent Examination Report for Application 2010268491 dated Feb. 8, 2013.
Government of India Examination Report for Application No. 787/CHENP/2012 dated Jun. 21, 2017.
Chinese Office Action for Application No. 201080032598.2 dated Jul. 29, 2013.

* cited by examiner

PERMANENT MAGNETIC ELECTRICAL MACHINE WITH BEARING RELEASE SYSTEM AND METHOD FOR BEARING REPLACEMENT

The present invention relates to a method for bearing replacement in an electrical machine, such as a permanent magnet generator (PMG), having at least one bearing. Furthermore, the present invention relates to an electrical machine, e.g. a permanent magnet generator or permanent magnet electrical machine, wherein the electrical machine being adapted for facilitating bearing replacement.

Rotating electrical machines comprise one or more bearings for allowing the rotor to rotate with respect to the stator of the electrical machine. Parts of electrical machines or generators in wind turbines are typically of large size and weight making replacement of bearings and other parts a difficult task. Furthermore, the free space in a wind turbine nacelle is limited making onsite maintenance difficult.

Thus there is a need for method and apparatus facilitating replacement of electrical machine bearings.

Accordingly, it is an object to provide an electrical machine for facilitating bearing replacement. Furthermore, it is an object of the present invention to provide a method for replacing or releasing a bearing in an electrical machine.

The above-mentioned and other objects are fulfilled by an electrical machine, e.g. a permanent magnet electrical machine, comprising a stator, e.g. with at least one stator winding, the stator defining a centre axis, a rotor having a first end and a second end, at least one bearing including a first bearing, and at least one support element including a first support element. The at least one bearing supports the rotor in an operational position in relation to the stator allowing the rotor to rotate in relation to the stator about the centre axis. The at least one support element may be adapted to support the rotor in relation to the stator such that the first support element in a support position supports the rotor centred about the centre axis, thereby allowing replacement of the first bearing.

The support element may in the support position be at least partly positioned between the rotor and the stator radially from the centre axis.

The electrical machine may be a permanent magnet generator (PMG), e.g. the rotor and/or the stator may comprise permanent magnetic material. In a permanent magnet electrical machine, such as a permanent magnet generator, the magnetic forces acting between the stator and the rotor may substantially even out when the rotor is in the centre position. If the rotor is displaced from the centre position, the strong magnetic forces acting between the stator and the rotor may hinder or complicate relocation of the rotor to the centre position. Thus, in particular for electrical machines having a rotor or stator comprising permanent magnetic material, it may be of importance that the rotor remains in the centre position while a bearing is replaced.

Furthermore, for electrical machines having a rotor or stator comprising permanent magnetic material, the resulting magnetic forces acting between the stator and the rotor may be strong even if the rotor is in the centre position or if the rotor is at least slightly displaced, e.g. 3 mm from the centre position. In general the air gap between rotor and stator is about 2-10 mm.

Thus, in particular for electrical machines, wherein the rotor/stator comprises permanent magnets, it may be of importance that the rotor is firmly supported in relation to the stator.

The rotor of an electrical machine for wind turbines is heavy, e.g. the rotor may have a weight from about 500 to 5,000 kg, and thus gravity forces acting on the bearing and other parts supporting the rotor are considerable.

Positioning the at least one support element at least partly between the rotor and the stator in a direction perpendicular to the centre axis facilitates the support of the rotor in relation to the stator, e.g. by providing a stronger support and/or adapting the at least one support element to better withstand the stress from the forces, e.g. magnetic and/or gravity, acting on the rotor, i.e. e.g. pulling and/or pushing the rotor towards the stator. Thus, provision of at least one support element adapted to be at least partly positioned between the stator and the rotor strengthens the support of the rotor in relation to the stator.

Further, the above-mentioned and other objects are fulfilled by a method for replacing a bearing in a permanent magnet electrical machine comprising the bearing, a stator with at least one stator winding, and a rotor having a first end and a second end. The stator defines a centre axis, and the bearing supports the rotor in an operational position in relation to the stator such that the rotor is centred about the centre axis allowing the rotor to rotate in relation to the stator about the centre axis. The method comprises supporting the rotor in relation to the stator using at least one support element in a support position such that the rotor remains centred about the centre axis while replacing the bearing. Preferably, the support element in the support position is at least partly positioned between the rotor and the stator in a direction perpendicular to the centre axis.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

The figures are schematic and simplified for clarity, and they may merely show details which are essential to the understanding of the invention, while other details may have been left out. Throughout, the same reference numerals are used for identical or corresponding parts.

Figure 1:
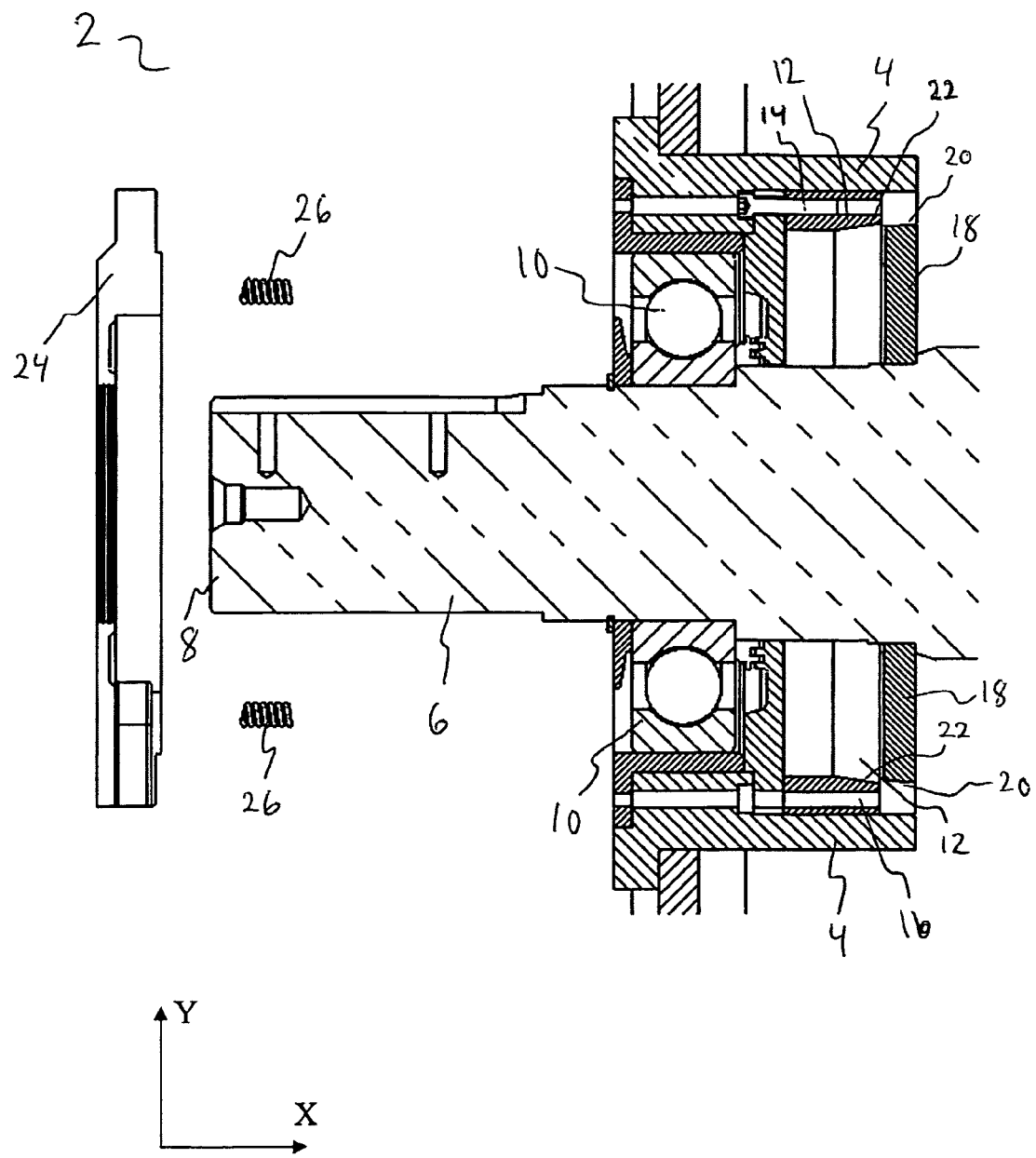
FIGS. 1-6 schematically illustrate a cross sectional view of a part of an embodiment of an electrical machine according to the present invention, FIG. 7 schematically illustrates a partly cross sectional view of an embodiment of an electrical machine according to the present invention.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and sufficient, and will fully convey the concept of the invention to those skilled in the art.

DETAILED DESCRIPTION

The present invention relates to an electrical machine and to a method for replacing a bearing in an electrical machine.

The electrical machine according to the present invention is adapted for facilitating replacement of a bearing in the electrical machine. Replacing a bearing may include changing it with another bearing or removing/moving the bearing, e.g. for repairing it, and reinstalling the bearing.

The stator has at least one stator winding and defines a centre axis. Preferably, the rotor comprises magnetic material, e.g. permanent magnetic material such as one or more permanent magnets embedded in or mounted on the rotor, and has a first end and a second end. The rotor may comprise a rotor shaft extending from the first end to the second end, the rotor shaft being adapted to rotate about the centre axis during operation. The stator may define a cavity accommodating the rotor shaft or at least a part thereof.

The at least one bearing may in an operational position support the rotor in relation to the stator and thereby allow the rotor to rotate in relation to the stator about the centre axis. Under some conditions however, e.g. if a part of the electrical machine providing connection between the first bearing and the stator is removed, the first bearing in the operational position may not support the rotor in relation to the stator.

The at least one support element may be adapted to support the rotor in relation to the stator such that the at least one support element in a support position supports the rotor centred about the centre axis, thereby allowing replacement of the first bearing.

The at least one support element may in the support position support the rotor centred about the centre axis in at least two support directions perpendicular to and radially from the centre axis. The at least two support directions may include a first support direction and a second support direction, wherein the first support direction and the second support direction form an angle larger than 10°, such as larger than 30°, e.g larger than 60°. The at least one support element may in the support position support the rotor centred about the centre axis, such that horizontal displacement of the rotor from the centre axis is prevented.

A support element, e.g. a first support element, a second support element, a third support element and/or a fourth support element, may in the support position be at least partly positioned between the rotor and the stator in a direction perpendicular to the centre axis.

The first bearing may be positioned along the centre axis between the first end of the rotor and the at least one support element in the support position.

The bearing(s) supporting the rotor in an operational position in relation to the stator may encircle the rotor.

The electrical machine may be designed for release of the first bearing in a first direction towards the first end of the rotor.

The at least one bearing may comprise a plurality of bearings including a second bearing. The second bearing may be positioned near the second end of the rotor.

The bearing(s) supporting the rotor in relation to the stator may be fixed to the rotor with an inner cover or a rotor bearing sleeve. The bearing(s) may be fixed to the stator with a stator bearing sleeve. The bearing sleeves encircle the rotor shaft.

The at least one support element may be positioned such that the first bearing is positioned between the first end of the rotor and the at least one support element taken along the centre axis. This allows easy replacement of the first bearing by allowing bearing parts, e.g. first bearing, bearing sleeves, to be slit off the rotor shaft without the support elements obstructing removal.

The stator may comprise at least one engagement part including a first engagement part. The at least one engagement part of the stator provides a supporting surface or connection for the at least one support element. Thus, the at least one engagement part of the stator is adapted to engage with the at least one support element. The at least one engagement part of the stator may comprise a thread. The at least one engagement part of the stator may provide a supporting surface or connection for the at least one support element. Thus, the at least one engagement part of the stator may be adapted to engage with the at least one support element in the support position. The at least one engagement part of the stator may comprise a frusto-conical engagement surface or a part thereof forming an angle with the centre axis, e.g. in the range from 0 to about 45°, such as in the range from 2° to about 25°, e.g. about 12°.

A support element, e.g. the first support element, the second support element, the third support element, and/or the fourth support element, may comprise a stator engagement part adapted to engage with a corresponding engagement part of the stator in the support position. The stator engagement part may comprise a thread.

The rotor may comprise at least one engagement part including a first engagement part. The at least one engagement part of the rotor provides a supporting surface or connection for the at least one support element. Thus, the at least one engagement part of the rotor is adapted to engage with the at least one support element in the support position. The at least one engagement part of the rotor may comprise at least one recess including a first recess or at least one protrusion including a first protrusion. The first protrusion may be an annular disc extending perpendicular to the centre axis. The first protrusion may be a frusto-conical protrusion, i.e. have a frusto-conical surface, on the rotor forming an angle with the centre axis, e.g. in the range from 0 to about 45°, such as in the range from 2° to about 25°, e.g. about 12°.

A support element, e.g. the first support element, the second support element, the third support element, and/or the fourth support element, may comprise a rotor engagement part adapted to engage with a corresponding engagement part of the rotor, in the support position.

The at least one support element may be adapted to fix the rotor in the support position in relation to the stator, e.g. such that the rotor is prevented from rotating about the centre axis and/or such that the rotor is prevented from being displaced from the centre position.

The rotor engagement part of a support element may comprise a protrusion and/or a seat, e.g. adapted to engage with the first engagement part of the rotor.

A support element may comprise a rod, e.g. as described in connection with FIGS. 7-12. The rod may include a rotor engagement part near or at a first end of the rod and/or a stator engagement part near or at a second end of the rod. Support element(s) comprising a rod or a substantially longitudinal member may be perpendicular to the centre axis in the electrical machine and be moved radially towards the centre axis in order to support the rotor in a support position. The rod may have a diameter in the range from about 1 cm to about 10 cm, such as from about 2 cm to about 7 cm. The rod may have a length from about 10 cm to about 100 cm, such as from about 30 cm to about 70 cm.

A support element may comprise at least one wedge including a first wedge adapted to engage with an engagement part of the stator and to engage with an engage-part of the rotor, e.g. by moving the support element comprising a wedge parallel to the centre axis.

The at least one support element may comprise a plurality of support elements including the first support element and a second support element. Furthermore, the plurality of support elements may include a third support element, may include a fourth support element, may include a fifth support element, may include a sixth support element, etc.

The plurality of support elements may comprise one or more sets of support elements, e.g. a first set of support elements and/or a second set of support elements. Furthermore, the plurality of support element may comprise a third set of support elements or more.

The support elements may be circumferentially and/or equidistantly spaced around the rotor.

A support element, e.g. the first support element, may comprise a first annular sleeve. The first annular sleeve may have at least one inner surface, e.g. an inner cylindrical or tapered surface, adapted to engage with the at least one engagement part of the rotor. The inner tapered surface may constitute or form a part of the rotor engagement part of the support element and form an angle with the centre axis, e.g. in the range from 0 to about 45°, such as in the range from 2° to about 25°. The first annular sleeve may have at least one outer tapered surface adapted to engage with the at least one engagement part of the stator. The outer tapered surface may constitute or form a part of the stator engagement part of the support element and form an angle with the centre axis, e.g. in the range from 0 to about 45°, such as in the range from 2° to about 25°, e.g. about 12°.

A stator engagement surface or part of a support element may form a frusto-conical surface or a part thereof. A rotor engagement surface or part of a support element may form a frusto-conical surface or a part thereof.

The first annular sleeve may be adapted to engage with the rotor by being displaced towards the engagement part of the rotor in a direction parallel with the centre axis.

A support element may be adapted to engage with the rotor/stator by being moved in a direction parallel or perpendicular with the centre axis.

The at least one support element may be movably, e.g. slidably, arranged in relation to the stator and/or the rotor, e.g. parallel or perpendicular to the centre axis. A support element may be movably arranged parallel to an axis, e.g parallel or perpendicular to the centre axis by rotating the support element about the axis. A thread coupling between engagement parts of a support element and stator/rotor may provide that rotation of an engagement part of support element/stator/rotor results in moving the support element parallel to the axis.

The stator may comprise at least one guide part including a first guide part, wherein the at least one guide part is adapted to guide the at least one support element into the support position. A guide part, e.g. the first guide part, may comprise a through bore adapted to guide a support element, e.g. the first support element, towards the rotor or an engagement part of the rotor, e.g. along a support axis perpendicular to the centre axis or parallel to the centre axis.

The electrical machine may comprise at least one fastening member including a first fastening member adapted to fasten the at least one support element to the stator.

During operation, the electrical machine may be positioned such that the force of gravity works in a direction perpendicular to the centre axis. For some embodiments, the resulting magnetic force acting between the stator and the rotor works in a direction perpendicular to the centre axis.

The resulting magnetic force acting between the rotor and the stator may however also include a component along the centre axis. In most situations this is however not of relevance for replacing a bearing since the rotor is normally prevented from being displaced parallel to the centre axis even when the bearing to be replaced is dismounted from the electrical machine.

The electrical machine according to the present invention may be a part of a wind turbine. Preferably, the electrical machine is a generator in a wind turbine.

The rotor may comprise a rotor shaft extending from a first end to a second end, e.g. having a length from about 0.5 m to 5 m. The diameter of the rotor may vary along the centre axis. The rotor diameter may be in the range from about 10 cm to about 100 cm.

The rotor may comprise one or more rotor windings and the stator may comprise permanent magnetic material.

The method and electrical machine according to the present invention provides safe and convenient replacement of one or more generator bearings in a wind turbine generator.

The method may be used for replacing a bearing in an electrical machine as described herein.

Embodiments of the method according to the present invention for replacing a bearing in an electrical machine, e.g. as described in the present application, comprises supporting the rotor in relation to the stator using at least one support element in a support position such that the rotor remains centred about the centre axis while replacing the bearing. Preferably, the at least one support element is at least partly positioned between the rotor and the stator radially from the centre axis when the support element is in the support position.

Preferably, the method comprises removing the bearing from the operational position in a direction towards the first end of the rotor.

Preferably, the method comprises installing a first replacement bearing on the electrical machine in a direction from the first end of the rotor towards the at least one support element.

In the method, supporting the rotor in relation to the stator may comprise moving an annular support element, e.g. having a tapered surface, parallel to the centre axis and into a support position.

In the method, supporting the rotor in relation to the stator may comprise moving a support element comprising a rod perpendicular to the centre axis and into a support position.

The method may comprise disengaging the support element(s) thereby bringing the electrical machine back into operational position.

FIGS. 1-6 schematically illustrate a cross sectional view of a part of an embodiment of an electrical machine 2 according to the present invention. Furthermore, FIGS. 1-6 illustrate a method for replacing a bearing in an electrical machine. The electrical machine 2 comprises a stator 4, a rotor 6 having a rotor shaft with a first end 8, a first bearing 10, a first support element 12, and a number of fastening members including a first fastening member 14 and a second fastening member 16. The stator has at least one stator winding, and the stator defines a centre axis which is parallel with the x-axis. The rotor may comprise permanent magnetic material (not shown).

The electrical machine may be positioned such that the force of gravity works in a direction opposite the y-axis during operation of the machine.

The rotor 6 comprises an engagement part comprising a disk-shaped protrusion 18 having a tapered or frusto-conical surface 20. The tapered surface 20 of the engagement part of the rotor 6 provides a supporting surface for the first support element 12.

The first support element comprises a slidably arranged annular sleeve 12 encircling the rotor shaft, i.e. the first support element is movably arranged parallel to the centre axis. The first support element 12 comprises a rotor engagement part comprising a tapered surface 22 adapted to engage with the first engagement part of the rotor 6. The first support element 12 is arranged for sliding parallel to the centre axis, i.e. parallel to the axis X. Thereby, the first support element can be moved into support position by moving the annular first support element 12 parallel to the centre axis and into a support position. The fastening members 14, 16 provide controlled positioning of the first support element 12. Each of the fastening members comprises an Allen bolt. The annular sleeve 12 may be divided into a number of separate support elements movably or slidably arranged parallel to the centre axis.

As illustrated in FIG. 1, an outer cover 24 and preload springs 26 are removed and shown displaced from the first bearing. The first bearing is in an operational position. In the operational position, the first bearing 10 supports the rotor 6 in relation to the stator and thereby allow the rotor to rotate in relation to the stator about the centre axis.

Figure 2:
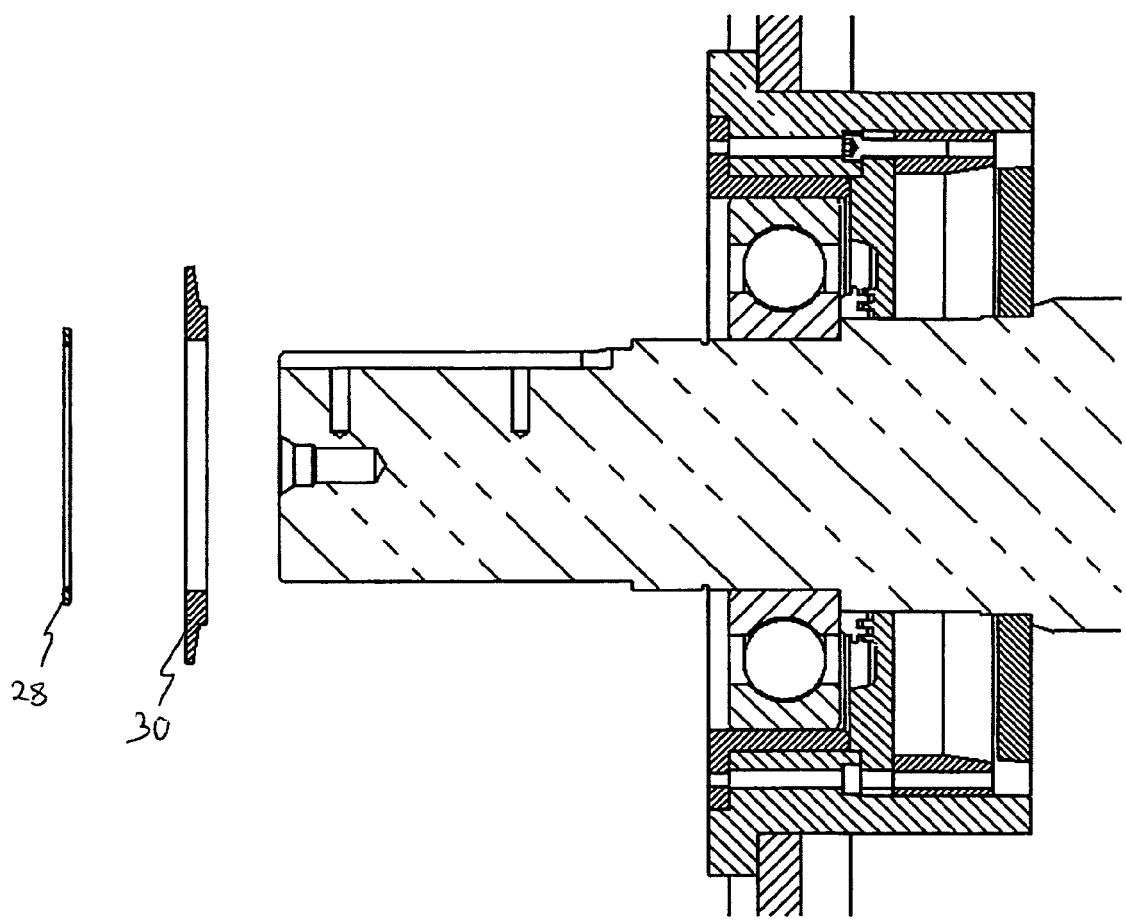

In FIG. 2, a spring clip 28 and an inner cover 30 are removed and shown displaced from the first bearing 10.

Figure 3:
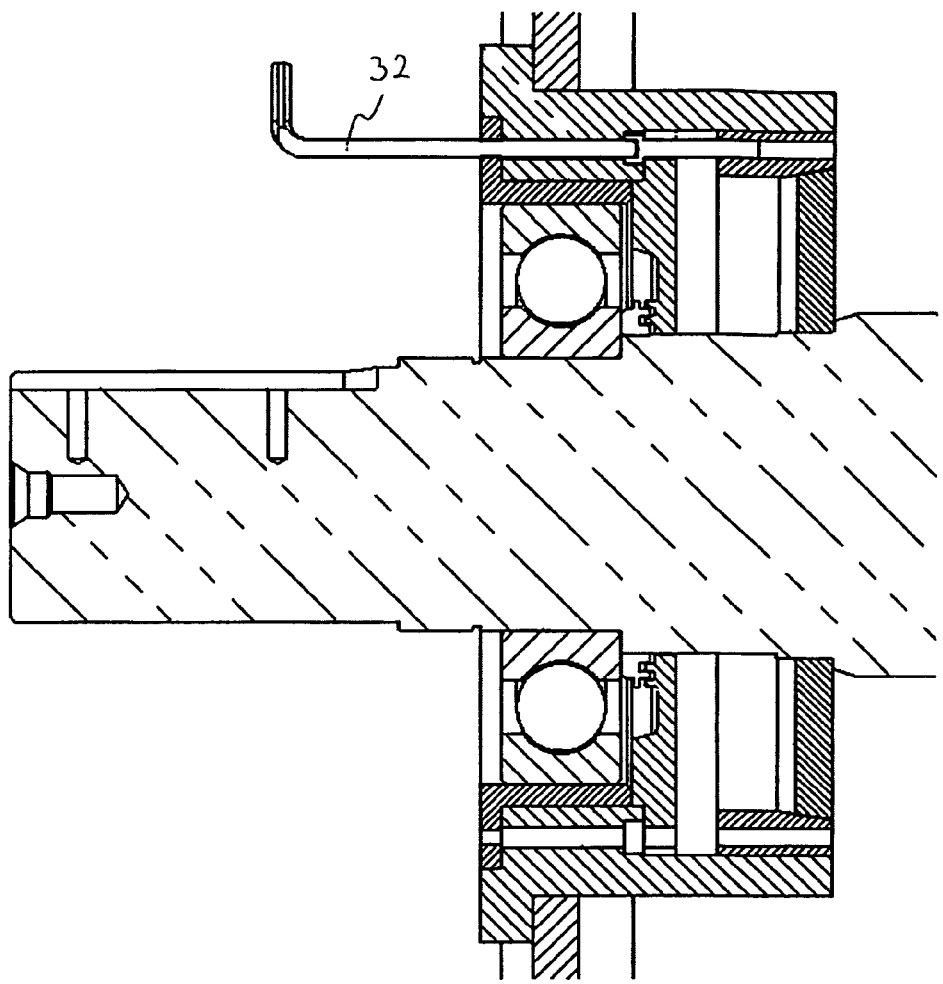

In FIG. 3, the first support element is shown in the support position. A wrench 32 is shown in engagement with the first fastening member. Rotation of the fastening members displace the first support element parallel to the centre axis into the support position, where the first support element is wedged between the respective engagement parts of the stator and the rotor.

The inner tapered surface 22 of the annular sleeve 12 is adapted to engage with the engagement part of the rotor in the support position. The outer surface of the annular sleeve (first support element) forms a stator engagement part of the first support element. The outer surface is cylindrical; however the stator engagement part of the first support element may comprise an outer tapered surface.

The engagement part of the rotor is adapted to engage with the first support element in the support position.

In the support position the first support element 12 supports the rotor in relation to the stator, i.e. supports the rotor centred about the centre axis, thereby allowing replacement of the first bearing 10. The support element in the support position is at least partly positioned between the rotor and the stator in a direction radially from the centre axis.

The first bearing is positioned along the centre axis between the first end of the rotor and the first support element in the support position allowing direct removal of the first bearing and bearing parts in the direction towards the first end. Thus, replacement of the first bearing is facilitated. The first support element 12 is adapted to fix the rotor in the support position in relation to the stator such that the rotor is prevented from rotating about the centre axis and such that the rotor is prevented from displacement perpendicularly to the centre axis.

The stator may comprise at least one engagement and/or guide part adapted to engage with and/or guide the first support element along the centre axis and towards the support position. The first support element may comprise a stator engagement part adapted to engage with the first engagement part of the stator in the support position.

Engagement between the stator and the support element may further prevent the support element from rotating about the centre axis and may therefore avoid putting excess stress on the fastening members, e.g. in case a torque is applied from the rotor when the support element is in the support position.

Figure 4:
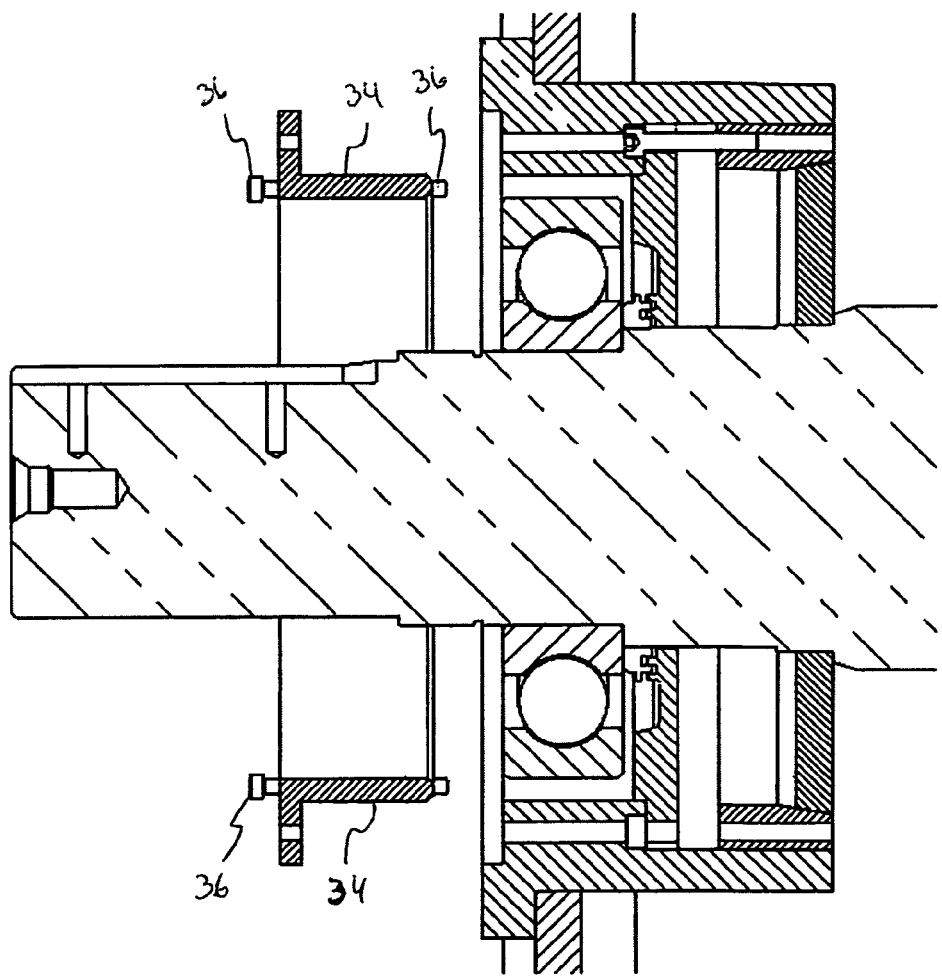

In FIG. 4, a bearing sleeve 34 is removed by use of Jacking bolts 36. The bearing sleeve and the jacking bolts are shown displaced from the first bearing.

Figure 5:
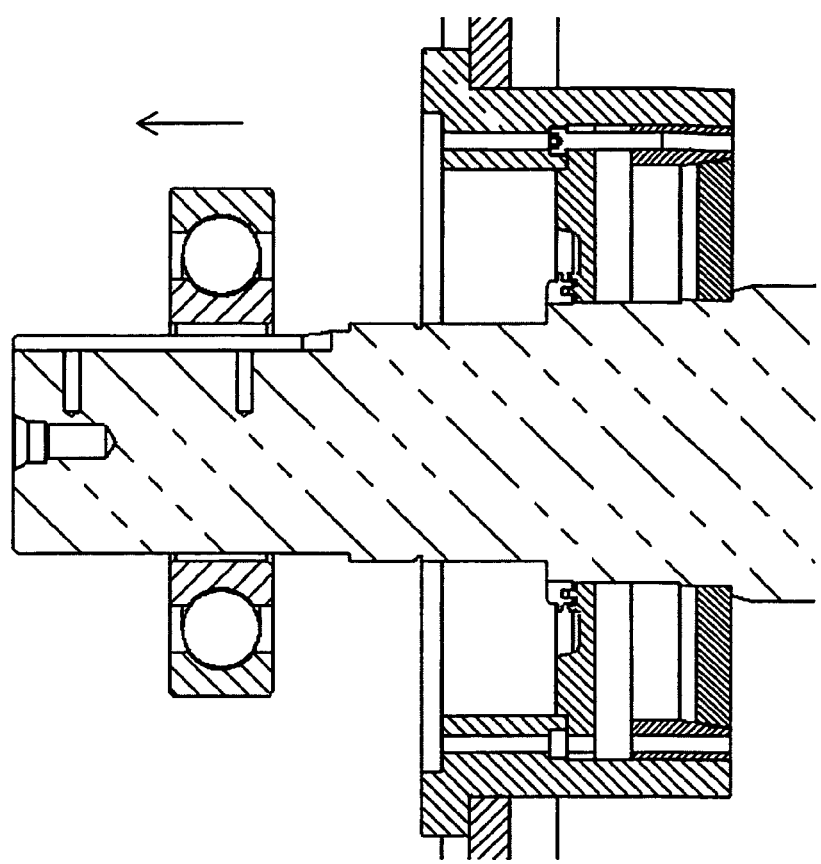

In FIG. 5, the bearing is removed from the operational position in a direction towards the first end of the rotor.

Figure 6:
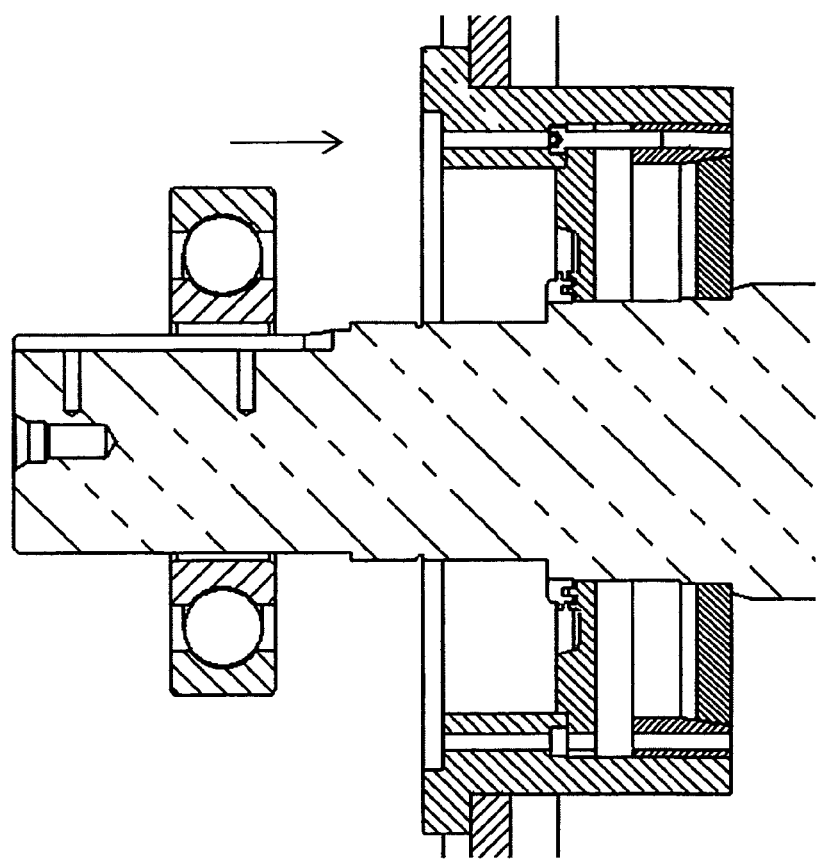

In FIG. 6, a replacement bearing (or the same bearing, e.g. repaired) is installed on the electrical machine by sliding the new bearing onto the rotor shaft.

The method and electrical machine illustrated in FIGS. 1-6 provide a uniform support of the rotor in relation to the stator during replacement of the bearing.

Provision of a method as illustrated in FIGS. 1-6 may have the advantage that only a single support element needs to be positioned in the support position for a bearing to be removed. Thereby the risk of forgetting to put one or more support elements out of a plurality of support elements in support positions is reduced.

Note that some of the actions carried out as illustrated in FIGS. 1-6 may be carried out in another order. For instance, the spring clip and the inner cover as illustrated in FIG. 2 may be removed after the support element is put in the support position as illustrated in FIG. 3. Furthermore, some of the actions illustrated in FIGS. 1-6 may not be essential for a method according to the present invention and may be specific for the specific embodiment illustrated in FIGS. 1-6.

Figure 7:
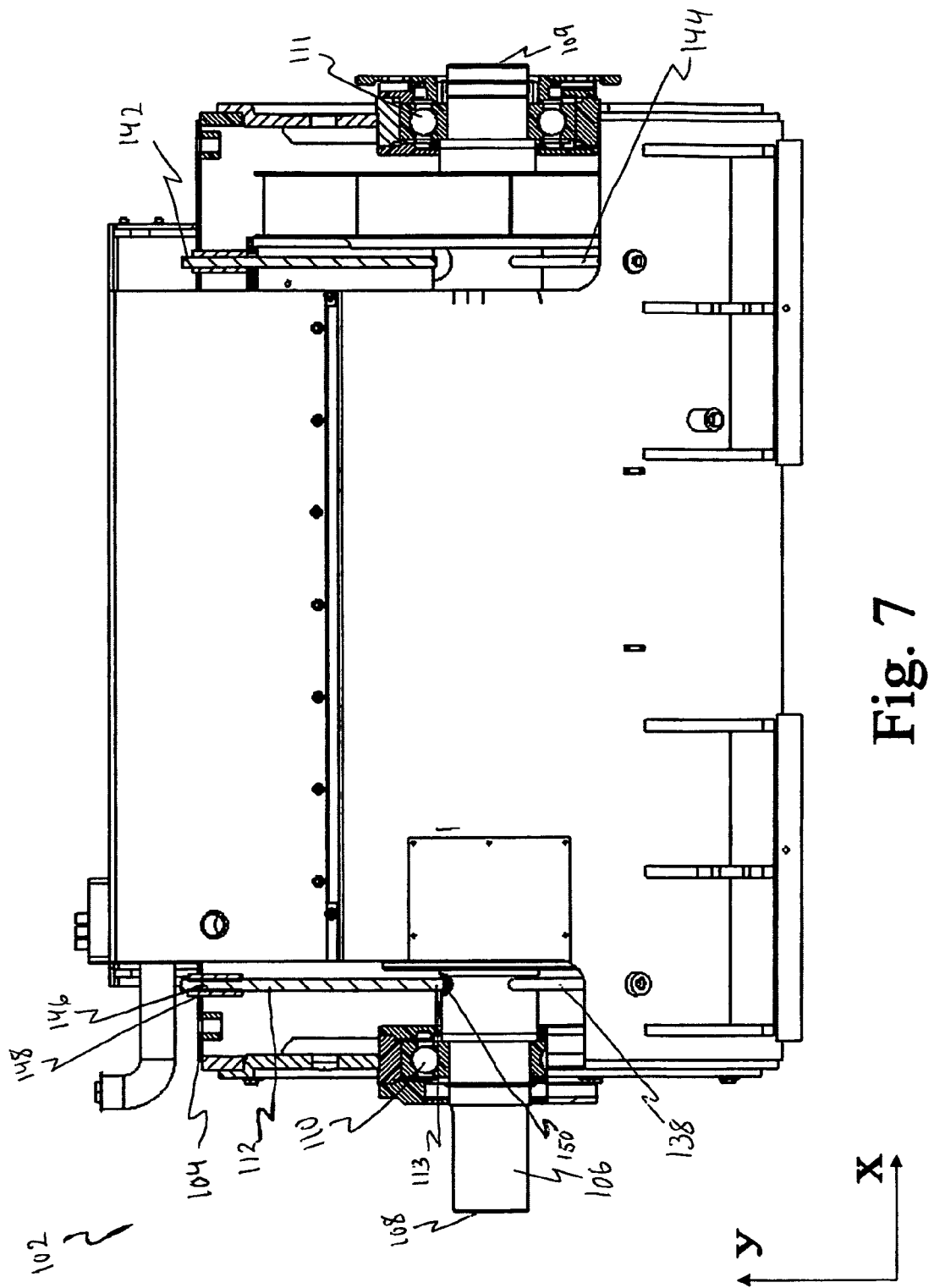

FIG. 7 schematically illustrates a partly cross sectional view of an embodiment of an electrical machine 102 according to the present invention. The electrical machine comprises a stator 104, a rotor 106 having a first end 108 and a second end 109, a number of bearings including a first bearing 110 and a second bearing 111, and a number of support elements.

The number of support elements includes a first set of support elements positioned close to the first bearing and a second set of support elements positioned close to the second bearing. The first set of support elements includes a first support element 112, a second support element 138, and a third support element 140 (see FIG. 8). The second set of support elements includes a fourth support element 142, a fifth support element 144, and a sixth support element (not shown on FIG. 7). The first support element 112 may be omitted.

The support elements 112, 138, 140, 142, 144 each comprise a rod having a first end 113 forming a rotor engagement part, and a second end. The support elements 112, 138, 140, 142, 144 are perpendicular to the centre axis in the electrical machine.

The first set of support elements 112, 138, 140 are shown in their support positions where they support the rotor 106 centred about the centre axis, thereby allowing replacement of the first bearing 110. The first support element (and the second support element, and the third support element) in the support position is at least partly positioned between the rotor and the stator in a direction perpendicular to the centre axis.

The first bearing is positioned between the first end of the rotor and the first set of support elements in the support positions taken along the centre axis.

The support elements of the electrical machine 102 each comprise a stator engagement part near the second end of the rod, e.g. a stator engagement part 146 of the first support element 112. The stator engagement part of the support elements 112, 138, 140, 142, 144 comprises a thread adapted to engage with a corresponding thread of an engagement part of the stator, e.g. the stator engagement part 146 of the first support element 112 is adapted to engage with the first engagement part 148 of the stator. The support elements are moved to the support position radially towards the centre axis (perpendicular to the centre axis) in order to support the rotor in a support position.

The rotor 106 comprises a first engagement part 150 in the form of a recess adapted to engage with the rotor engagement part of the first support element 112 in the support position. The first engagement part 150 of the rotor may take any suitable form, e.g. a circular recess, an oblong recess parallel to the centre axis or an oblong recess perpendicular to the centre axis. In the electrical machine 102, the rotor has a circular recess forming an engagement part of the rotor for each of the support elements.

In the electrical machine 102, the at least one support element is adapted to fix the rotor in relation to the stator in the support position such that the rotor is prevented from rotating about the centre axis.

The stator 104 is adapted such that the first support element 112 in the support position is positioned along a first support axis (in a first support direction) perpendicular to the centre axis. Furthermore, the stator is adapted such that the second support element 138 in the support position is positioned along a second support axis (in a second support direction) perpendicular to the centre axis, and so on for the third support element 140.

Figure 8:
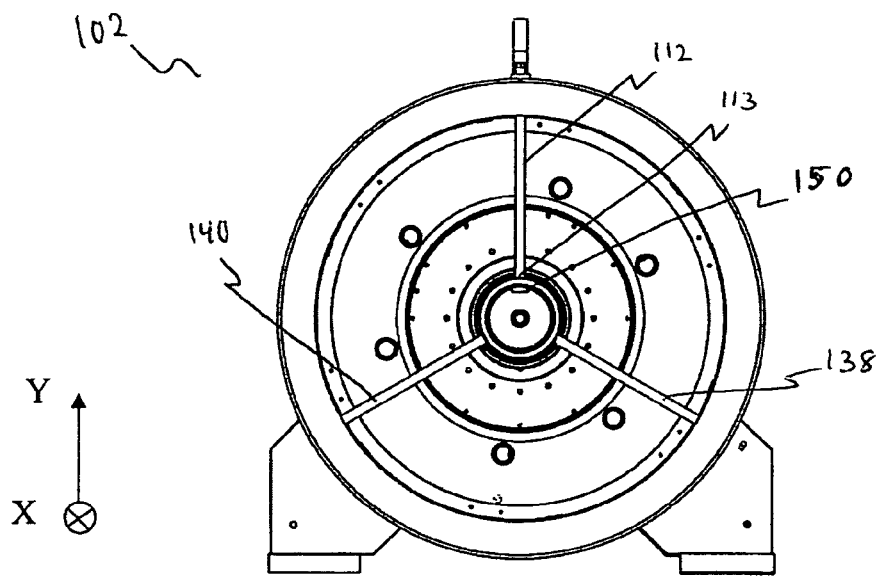
FIG. 8 is a schematic cross sectional view of an electrical machine according to the present invention perpendicular to the centre axis of the stator.

FIG. 8 is a schematic cross sectional view of the electrical machine in FIG. 7 perpendicular to the centre axis of the stator, i.e. the x-axis. The support elements 112, 138 and 140 are circumferentially and equidistantly spaced around the rotor, i.e. at an angle of 120° between support elements. The angle between the second and the third support element may be in the range from about 20° to about 150°, such as from about 50° to about 130°, e.g. about 90° or about 110°.

Figure 9:
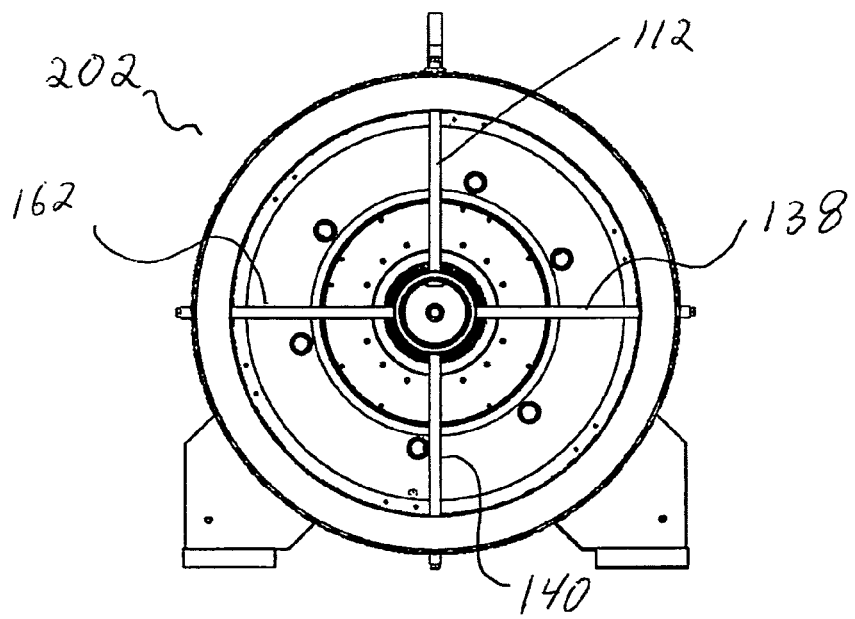
FIG. 9 is a schematic cross sectional view of an electrical machine according to the present invention perpendicular to the centre axis of the stator.
Figure 10:
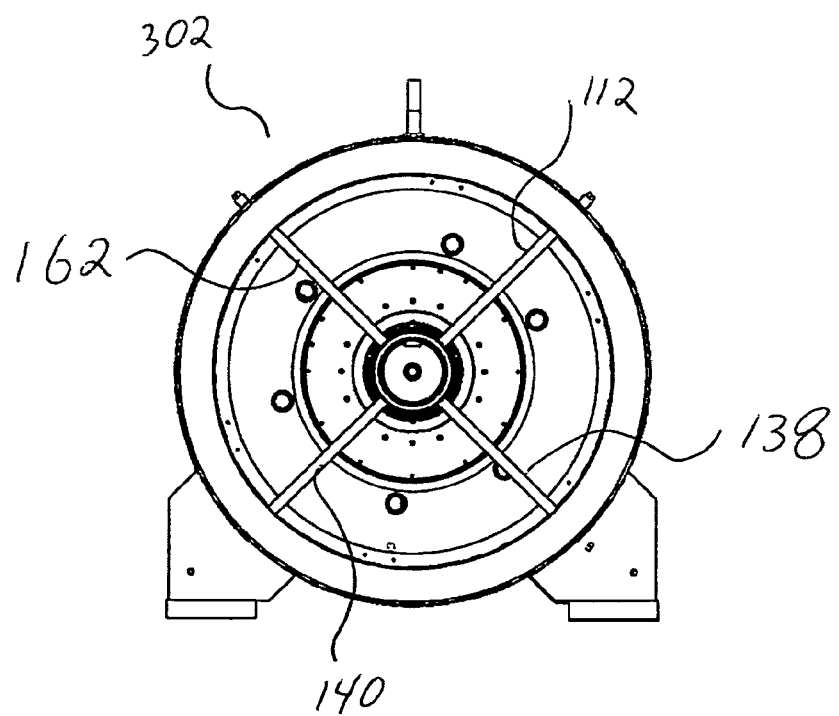
FIG. 10 is a schematic cross sectional view of an electrical machine according to the present invention perpendicular to the centre axis of the stator.

FIGS. 9-10 are schematic cross sectional views of two exemplary embodiments of an electrical machine according to the invention perpendicular to the centre axis of the stator, i.e. the x-axis, showing examples of support elements and positions of the support elements.

In FIG. 9, the electrical machine 202 comprises a first set of support elements comprising four support elements 112, 138, 140, 162 circumferentially and equidistantly spaced around the rotor perpendicular to the centre axis. The first support element 112 and the third support element are vertical and the second support element 138 and the fourth support element 162 are horizontal.

In FIG. 10, the electrical machine 302 comprises a first set of support elements comprising four support elements 112, 138, 140, 162 circumferentially and equidistantly spaced around the rotor perpendicular to the centre axis. The first support element 112 is positioned in a 45° angle with respect to horizontal. The support elements are distributed around the circumference of the rotor with an angle of 90° between neighbouring support elements.

An electrical machine may comprise a first set of support elements comprising two, three or more support elements extending radially and substantially perpendicular from the centre axis. Support elements of the first set of support elements may be circumferentially and equidistantly spaced around the rotor perpendicular to the centre axis, e.g. with a first support element positioned vertically under the rotor.

Other positions of the support elements, e.g. non-equidistant spacing between support elements, may be provided.

The invention claimed is:

1. A permanent magnet electrical machine comprising:
   a stator with at least one stator winding;
   the stator defining a center axis;
   a rotor comprising permanent magnetic material and having a first end and a second end;
   a bearing supporting the rotor in an operational position in relation to the stator allowing the rotor to rotate in relation to the stator about the center axis;
   a support element adapted to support the rotor in relation to the stator such that the support element supports the rotor centered about the center axis, thereby allowing replacement of the first bearing, the support element being at least partly positioned between the rotor and the stator in a direction radially from the center axis.

2. The electrical machine according to claim 1, wherein the bearing is positioned along the center axis between the first end of the rotor and the support element.

3. The electrical machine according to claim 1, wherein the stator comprises an engagement part adapted to engage with the support element.

4. The electrical machine according to claim 3, wherein the support element comprises a stator engagement part adapted to engage with the engagement part of the stator in a support position.

5. The electrical machine according to claim 1, wherein the rotor comprises a engagement part, the engagement part comprising at least one of: a recess and a protrusion, wherein the recess and protrusion are adapted to engage with the support element.

6. The electrical machine according to claim 5, wherein the support element comprises a rotor engagement part adapted to engage with the engagement part of the rotor.

7. The electrical machine according to claim 6, wherein the support element is adapted to fix the rotor in relation to the stator such that the rotor is prevented from rotating about the center axis.

8. The electrical machine according to claim 6, wherein the rotor engagement part of the support element comprises a protrusion adapted to engage with the engagement part of the rotor.

9. The electrical machine according to claim 1, wherein the support element comprises a rod.

10. The electrical machine according to claim 5, wherein the support element comprises at a wedge adapted to engage with the stator and to engage with the at least one engagement part of the rotor.

11. The electrical machine according to claim 1, further comprising a plurality of support elements.

12. The electrical machine according to claim 11, wherein the plurality of support elements includes at least three support elements.

13. The electrical machine according to claim 11, wherein the plurality of support elements are circumferentially spaced around the rotor.

14. The electrical machine according to claim 1, wherein the support element comprises an annular sleeve.

15. The electrical machine according to claim 14, wherein the annular sleeve has at least one tapered surface adapted to engage with an engagement part of the rotor.

16. The electrical machine according to claim 1, wherein the support element is movably arranged parallel to the center axis.

17. The electrical machine according to claim 1, wherein the support element is movably arranged perpendicular to the center axis.

18. The electrical machine according to claim 1, further comprising a fastening member adapted to fasten the support element to the stator.

19. A method for replacing a bearing in a permanent magnet electrical machine comprising:
   providing a stator with at least one stator winding;
   providing a rotor having a first end and a second end, and a support element, wherein the stator defines a center axis, and wherein the bearing supports the rotor in an operational position in relation to the stator such that the rotor being centered about the center axis allows the rotor to rotate in relation to the stator about the center axis; and
   supporting the rotor in relation to the stator using the support element in a support position such that the rotor remains centered about the center axis while replacing the bearing, the support element being at least partly positioned between the rotor and the stator radially from the center axis.

20. The method according to claim 19, further comprising removing the bearing from the operational position in a direction towards the first end of the rotor.

21. The method according to claim 20, further comprising installing a replacement bearing on the electrical machine in a direction from the first end of the rotor towards the support element.

22. The method according to claim 19, wherein the bearing is positioned along the center axis between the first end of the rotor and the support element.

* * * * *